United States Patent Office
3,655,802
Patented Apr. 11, 1972

3,655,802
PROCESS FOR OBTAINING CRUDE ANTHRACENE FROM MIXTURES CONTAINING PHENANTHRENE, ANTHRACENE AND THEIR HOMOLOGS
Herbert Buffleb, Castrop-Rauxel, Heinz Gerhard Franck, and Rudolf Oberkobusch, Duisburg-Meiderich, Johannes Turowski, Castrop-Rauxel, Gerd Collin, Duisburg-Meiderich, and Maximilian Zander, Castrop-Rauxel, Germany, assignors to Rutgerswerke Aktiengesellschaft, Frankfurt am Main, Germany
No Drawing. Filed Jan. 28, 1970, Ser. No. 6,574
Claims priority, application Germany, Feb. 12, 1969, P 19 06 807.6
Int. Cl. C07c 3/58
U.S. Cl. 260—672    7 Claims

ABSTRACT OF THE DISCLOSURE

Increased yields of crude anthracene are obtained from a mixture containing phenanthrene, anthracene, and their homologs, e.g., from a fraction having a boiling range of 338–355° C., obtained preferably from a residual oil from benzene pyrolysis to ethylene rich in aromatic substances, by reacting said fraction at temperatures between 700 and 850° C., preferably between 750 and 800° C., with a time of stay of 1 to 10 seconds, with a tenfold to twenty-fold molecular excess of hydrogen and separating the anthracene from the reaction product in conventional manner. From the reaction product a crude anthracene of 55% and a yield of 60% based on the weight of anthracene present in the reaction product, can be obtained by fractional distillation.

---

This invention relates to a process for obtaining crude anthracene from mixtures which contain anthracene ($C_6H_4$:$(CH)_2$:$C_6H_4$), phenanthrene ($C_4H_{10}$) and their homologs.

Crude anthracene contains more than 40%, preferably more than 50%, of anthracene, is an industrially important starting material in the preparation of pure anthracene for the synthesis of anthraquinone and it plays, therefore, an important role as a raw material of the dyestuff industry.

The accompanying substance which makes the obtaining of crude anthracene difficult, is the phenanthrene. The phenanthrene homologs are found in the boiling range of industrial aromatic fractions of the anthracene homologs. The anthracene homologs present in industrial aromatic fractions have not been utilized for the recovery of anthracene prior to the present invention.

The main object of the present invention is to enlarge the basis of raw material for the production of anthracene.

It has been found that this object is attained according to the present invention by subjecting mixtures which contain phenanthrene, anthracene, their homologs and other accompanying substances to dealkylation at temperatures in the range between 700 and 850° C., preferably between 750 and 800° C., at a time of stay amounting to 1 to 10 seconds, and with a tenfold to twentyfold molecular excess of hydrogen and further processing the reaction product in conventional manner.

Unexpectedly, it has been found that under said conditions a selective hydrodealkylation of the homologs, with preferred dealkylation of the anthracene homologs, takes place. It has been further found that in carrying out the present invention reaction products are obtained, in which the anthracene content of the reacted material, in comparison with the anthracene content of the starting material, is increased and, at the same time, the proportion anthracene:phenanthrene has been shifted in favor of anthracene. The preferred reaction temperature is 750 to 800° C., the time of stay in the reaction space is 1–10 seconds and the molecular excess of hydrogen is 10- to 20-fold. Under these conditions, the anthracene concentration in the reaction product is about tripled in comparison with the starting material—for example, from 7 to 22%, and the proportion anthracene:phenanthrene is more than doubled, e.g., from 1:37 to 1:1.5. From this reaction product a crude anthracene of about 55%, with a yield of about 60% can be obtained by distillation, while—under equal conditions of distillation—from the starting material of the dealkylation no "crude anthracene" can be recovered, due to the unfavorable anthracene/phenanthrene proportion.

EXAMPLE 1

100 parts by weight of an industrial fraction of aromatic substances, said fraction having a boiling range of 338–355° C. and the following composition:

|  | Percent |
|---|---|
| Phenanthrene | 26 |
| Anthracene | 7 |
| Methylphenanthrene | 33 |
| Methylanthracene | 9 | are treated with 7 parts by weight of hydrogen by passing the fraction with a time of stay of 3 seconds through an empty tube heated to 800° C. 56 parts by weight of the reaction product were condensed. Analysis of this reaction product:

|  | Percent |
|---|---|
| Phenanthrene | 32 |
| Anthracene | 22 |
| Methylphenanthrene | 20 |
| Methylanthracene | 6 |

By dealkylation of methylanthracene 5.3 parts by weight of anthracene were newly formed, and the proportion anthracene/phenanthrene was increased from 1:3.7 to 1:1.5. From the reaction product, by distillation through a column having 80 trays, operating with a reflux ratio of 6:1, 24% of "crude anthracene" of 55% were recovered. This corresponds to a yield of 60% based on the anthracene present in the reaction product. From the fraction used as starting material in the dealkylation reaction, a "crude anthracene" of 55% could not be obtained under equal conditions of distillation.

EXAMPLE 2

100 parts by weight of an industrial fraction of aromatic substances, said fraction having a boiling range of 338–355° C. and the following composition:

|  | Percent |
|---|---|
| Phenanthrene | 26 |
| Anthracene | 7 |
| Methylphenanthrene | 33 |
| Methylanthracene | 9 | are treated with 7 parts by weight of hydrogen by passing the fraction with a time of stay of 3 seconds through an empty tube heated to 750° C. 67 parts by weight of the reaction product were condensed. Analysis of this reaction product:

|  | Percent |
|---|---|
| Phenanthrene | 30 |
| Anthracene | 19 |
| Methylphenanthrene | 30 |
| Methylanthracene | 5 |

By dealkylation of methylanthracene 5.7 parts by weight of anthracene were newly formed, and the proportion anthracene/phenanthrene was increased from 1:3.7 to 1:1.6. From the reaction product, by distillation through a column having 80 trays, operating with a reflux ratio of 6:1, 19% of "crude anthracene" of 55% were recovered. This corresponds to a yield of 55% based on the anthracene present in the reaction product. From the fraction used as starting material in the dealkylation reaction, a "crude anthracene" of 55% could not be obtained under equal conditions of distillation.

The term "part" and "%" used herein are by weight, if not otherwise stated.

The term "crude anthracene" is the trade name of a commercial product containing more than 40 or 50% of anthracene and is used herein to denote such product.

The term "other accompanying substances" is used to denote substances, such as hydrocarbon oils and aromatic substances present in industrial fractions of the boiling range of anthracene and its homologs obtained preferably from a residual oil from benzine pyrolysis to ethylene rich in aromatic substances. The fraction used as starting material in the dealkylation described in the above example was a fraction obtained preferably from a residual oil from benzene pyrolysis to ethylene rich in aromatic substances and the boiling range of 338–355° C. refers to boiling under a pressure of 760 torr. The tube used in said example was an iron tube of 2 cm. diameter and a length of 30 cm.

It will be understood that the present invention is not limited to the specific fractions, proportions, and other specific data or steps described above and can be applied to any mixtures containing phenanthrene, anthracene as well as their homologs.

What is claimed is:

1. A process for producing crude anthracene from a mixture containing anthracene, phanthrene as well as their homologs, comprising subjecting said mixture to dealkylation by reacting said mixture at a temperature in the range of 700 to 850° C. with a tenfold to twenty-fold molecular excess of hydrogen during a time of stay of 1 to 10 seconds and sperating crude anthracene from the reaction product.

2. A process as claimed in claim 1, in which crude anthracene is recovered from the reaction product by fractional distillation.

3. A process as claimed in claim 1, in which the anthracene homolog consists of methylanthracene and the phenanthrene homolog consists of methylphenanthrene.

4. A process for producing crude anthracene from a distillation fraction having a boiling range of about 338–355° C., obtained preferably from a residual oil from benzine pyrolysis to ethylene rich in aromatic substances comprising reacting said fraction at a temperature in the range of 700 to 850° C. with a tenfold to twentyfold molecular excess of hydrogen during a time of stay of 1 to 10 seconds and separating crude anthracene from the reaction product.

5. A process as claimed in claim 4, in which crude anthracene is recovered from the reaction product by fractional distillation.

6. A process as claimed in claim 1, in which the reaction is carried out at a temperature in the range of 750–800° C.

7. A process as claimed in claim 4, in which the reaction is carried out at a temperature in the range of 750–800° C.

References Cited

UNITED STATES PATENTS 3,317,622  5/1967  Hoertz et al. _____ 260—672
3,317,623  5/1967  Green et al. _____ 260—672

CURTIS R. DAVIS, Primary Examiner

U.S. Cl. X.R.

260—675